US011862130B2

(12) United States Patent
Murthy

(10) Patent No.: US 11,862,130 B2
(45) Date of Patent: Jan. 2, 2024

(54) PORTABLE DRUM KIT

(71) Applicant: Jay Jayanth Murthy, Ahmedabad (IN)

(72) Inventor: Jay Jayanth Murthy, Ahmedabad (IN)

( * ) Notice: Subject to any disclaimer, the term of this patent is extended or adjusted under 35 U.S.C. 154(b) by 414 days.

(21) Appl. No.: 17/293,154

(22) PCT Filed: Nov. 1, 2019

(86) PCT No.: PCT/IB2019/059391
§ 371 (c)(1),
(2) Date: May 12, 2021

(87) PCT Pub. No.: WO2020/099975
PCT Pub. Date: May 22, 2020

(65) Prior Publication Data

US 2022/0013096 A1 Jan. 13, 2022

(30) Foreign Application Priority Data

Nov. 12, 2018 (IN) ............................ 201821042375

(51) Int. Cl.
*G10D 13/02* (2020.01)
*G10D 13/10* (2020.01)
*G10D 13/065* (2020.01)

(52) U.S. Cl.
CPC ............ *G10D 13/28* (2020.02); *G10D 13/02* (2013.01); *G10D 13/065* (2013.01)

(58) Field of Classification Search
CPC ...... G10D 13/28; G10D 13/02; G10D 13/065; G10D 13/00; G10D 13/063
See application file for complete search history.

(56) References Cited

U.S. PATENT DOCUMENTS 6,075,190 A 6/2000 Mosser et al.
9,449,588 B2 9/2016 Verderosa
11,295,710 B1 * 4/2022 Hirasawa ............... G10D 13/11

* cited by examiner

*Primary Examiner* — Kimberly R Lockett
(74) *Attorney, Agent, or Firm* — Simpson & Simpson, PLLC

(57) ABSTRACT

A portable drum kit is disclosed. The disclosed drum kit comprising a base; musical instruments comprising one or more drums and at least one cymbal to be fitted on the base; one or more vertical columns fixed to the base to support at least one of the musical instruments at; one or more rod members detachably coupled to the one or more musical instruments; and at least one pair of modular clamps adapted to enable fitment of the least one of the one or more drums and the at least one cymbal to the vertical columns. The modular clamps allow movement of the musical instruments between an collapsed position in which the drums and the cymbal are placed closer to each other, and a deployed position in which the drums and the cymbal are placed at desired positions to allow a percussionist to use the drum kit.

20 Claims, 21 Drawing Sheets

PORTABLE DRUM KIT

TECHNICAL FIELD

The present disclosure relates generally to the technical field of musical instruments. More specifically, it pertains to a simple and cost effective portable drum kit.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

A drum is a musical instrument in category of percussion instrument i.e. one which emits sounds when struck on with sticks or hands. The person who plays it is called percussionist or player or drummer (hereinafter for clarity it will be referred to as percussionist). Drums are typically cylindrical, barrel-shaped, or bowl-shaped, with a taut membrane over one or both ends which vibrates to emit sound. Drums can be classified as membranophones in the category of percussion; which create sounds by striking or vibrating the instruments. A drum set, or drum kit, is generally a combination or set of number of drums and cymbals. Cymbals are also a type of percussion instrument, slightly concave round metal plates usually struck with one another or sticks. A drum kit may contain any other musical instrument apart from the drums and cymbals as per the requirement of the percussionist. However, normally the drum kits are a set-up combination of drums and cymbals. Drums are amongst the oldest instruments in the world with origins dating back to 6000 BC. Right before the development in 1860s, single drums and cymbals were played independently by different percussionists. Gradually, percussionists tried to develop ways by which one person could do the job of multiple percussionists. Various percussions were set-up with a drummer in the centre. That was how one of the first drum kits was conceived.

A fundamental kit contains 5 drums i.e. (1) Snare drum, (2) Bass drum, (3) High Tom (a kind of drum), (4) Floor Tom (a kind of drum), (5) Mid Tom (a kind of drum) as well as one or more cymbals such as Hi-Hats cymbal, Crash cymbal, Ride cymbal etc., all of them are mounted on metal stands or steel rods and played with sticks generally. Owing to the fact that it is operated by a single person, few components are operated and played using a pedal, such as bass drum and Hi-Hat. A typical five-piece acoustic drum kit weighs around 43 kilograms and it has many parts and components in it having different size and shapes. These parts are delicate and need to be handled carefully. The drum kits are costly and it affects to the player if any part is broken or not working well due to scratches or mishandling while travelling or packing or unpacking.

The typical drum kit needs time and effort to assemble and dismantle all components, each time, before and after playing it or for moving or transporting it. This requires a lot of time, efforts and energy. All components of the drum kit are separate, and a percussionist must assemble those on stage before performing and dismantle and re-pack them after the performance. This process takes approximately 30-45 minutes to set up on stage typical 5-pieces drum kit (total of 8 components including cymbals) by a single person and again it takes 30-45 minutes to pack up. Further, for transportation, it needs proper packaging, which further takes time. Loose pieces and components need proper packing and protection. Most percussionists transport their kits without proper cases, increasing the risk of damage, delays, and injury. Some percussionists use cardboard boxes with thermocol sheets or bubble wraps to pack components of the drum kit. Further, to avoid damage, bubble wraps and cardboard box needs to be sealed with sealing tapes each time. Cardboard boxes are not water proof and can be torn down while transportation causing inconvenience. The bubble wrap, thermocol, sealing tapes etc. all packaging material are not durable material and need to be bought several times, therefore, there is an additional cost as well as an additional provision to carry such packaging material with the drum kit is required. This method leads to wastage of material, time and money.

Metal or wooden boxes are not easily available. Most of the times, they are custom made, considering size and shape of the specific drums and cymbals, which makes them very costly. Wooden and metal boxes being used in industry are separate for each instrument and hence requires good amount of space and increases weight and hence not convenient to transport. The typical or custom cases which are available in leather or fibre bags are costly and may not be afforded by every percussionist. Further, these custom boxes are also separate for each drum and each component. Professional quality drum case prices are very high and sometime more than the drum kit prices. Many percussionists prefer to purchase and play electric drum kits due to their portability and ease while reluctantly compromising on the sound quality of classic acoustic drum kits.

Multiple components of a typical drum kit which all cannot be packed together—There are 5 drums, 4 cymbals, their stands, and other parts, which are not capable of being packed in a single box due to their differing sizes and shapes. Several people who look forward to purchasing a drum kit and learn drumming are unable to do so as they do not have space for a drum kit in their houses. They are either forced to let go of their aspirations or learn on electric kits or octopods which aren't even close to the genuine instrument. Loss of any part while transportation or while assemble or packing the drum kits are possible which can cause inconvenience while performance as well as additional cost and stress to keep all parts safe.

There is, therefore, a need in the art to provide a simple, cost effective and efficient portable drum kit which can obviate limitations of typical drum kits.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS OF THE INVENTION

A general object of the present disclosure is to provide an efficient solution to the aforementioned problems associated with typical drum kits.

An object of the present disclosure is to provide a portable drum kit which can obviate limitations of typical drum sets.

Another object of the present disclosure is to provide a pre-assembled drum kit to make it quick and convenient to open and repack, by single person easily. Further, being attached to each other, there is no fear of missing any part while travelling or packing or unpacking.

Another object of the present disclosure is to provide a simple, cost effective and compact drum kit with all the components of a traditional 5-piece drum kit without compromising on the quality and utility of a conventional acoustic drum kit but with convenience of transportation, packing, unpacking and utilising the same with economical ways.

These and other objects of the present invention will become readily apparent from the following detailed description taken in conjunction with the accompanying drawings.

SUMMARY

Aspects of present disclosure relate to musical instruments. Particularly, it pertains to a simple and cost effective portable drum kit. The present disclosure provides an efficient solution to the major problems associated with conventional drum kits. The disclosed drum kit maintains and sustains the same feel and experience of an acoustic drum kit, while being easy and quick to set-up/dismantle, convenient to transport, saving time, money and efforts.

In an aspect, the disclosed drum kit can include a base; one or more musical instruments include one or more drums and at least one cymbal to be fitted on the base; one or more vertical columns fixed to the base to support at least one of the one or more musical instruments at a predefined height above the base; one or more rod members detachably coupled to the one or more musical instruments; and at least one pair of modular clamps adapted to enable fitment of the least one of the one or more drums and the at least one cymbal to the one or more vertical columns and/or horizontal column/beams. Each of the at least one pair of modular clamps comprises a double v-clamp to engage with one of the one or more vertical columns or one of the one or more rod members detachably coupled to the one or more musical instruments or any other rod like structure, and at least one cylindrical coupling member having either a female coupling or a male coupling that is fitted on outer surface of the cylindrical coupling member to engage with the corresponding male coupling or female coupling of the corresponding modular clamp, and a first wing nut for connecting the at least one cylindrical coupling member with the double v-clamp. The at least one cylindrical coupling member having serration that engages with corresponding serration on the double v-clamp to allow coupling of the at least one cylindrical coupling member with the double v-clamp in different orientation along an axis of the corresponding modular bracket.

In an embodiment, the at least one cylindrical coupling member of each of the at least one pair of modular clamp can include at least one first cylindrical coupling member having a female coupling, and at least one second cylindrical coupling member having a male coupling to engage with the corresponding female coupling of the corresponding modular clamp. The at least one of the at least one first cylindrical coupling member and the at least one second cylindrical coupling member having serration on any or both of a lower surface and an upper surface to enable engagement of the at least one first cylindrical coupling member with the at least one second cylindrical coupling member in different orientation along the axis of the respective modular clamp. A spare male coupling or female coupling of each of the at least one pair of modular clamps allow coupling with the corresponding female coupling or male coupling of another modular clamp to allow coupling of another musical instrument or other elements/accessory, such as but not limited to, mic, music sheet holder and the like.

In an embodiment, the double V-clamp of the each of the at least one pair of modular clamps can include an upper member, lower member and a lock wing nut to enable tightening or loosening of the double V-clamp.

In an embodiment, the at least one pair of modular clamps can allow movement of the at least one of the one or more drums and the at least one cymbal between a collapsed position in which the least one of the one or more drums and the at least one cymbal are placed closer to each other, and a deployed position in which the least one of the one or more drums and the at least one cymbal are placed at desired positions to allow a percussionist to use the drum kit.

In an embodiment, the portable drum kit can include one or more modular brackets to enable coupling of the one or more rod members to the one or more musical instruments. The one or more rod members can be generally L-shaped. The rod members can move along the length of the vertical columns.

In another embodiment, the one or more rod members can be of any shape, for example, U-shaped, S shaped etc.

In an embodiment, each of the one or more modular brackets can include a base bracket member configured for fitment to the at least one of the one or more drums, a holding member configured for fitment with the base bracket member with assistance of a second wing nut, and having at least one hole for fitment of the corresponding rod member with assistance of a third wing nut.

In an embodiment, the each of the one or more modular bracket can include at least one coupling member having either a female coupling or a male coupling to allow coupling of one or more other elements to the corresponding brackets, and wherein the at least one coupling member is configured for fitment between the base bracket and the holding member.

In an embodiment, each of the one or more modular brackets allow rotation of the respective drum along a first axis and a second axis of the respective modular bracket.

In an embodiment, the one or more drums can include a bass drum, mid tom, a high tom, a floor tom and a snare drum, and wherein the at least one cymbal comprises a crash cymbal, a ride cymbal and a hi-hats cymbal.

In an embodiment, the base can include a plurality of caster configured on a lower surface of the base to allow movement of the base, and wherein each of the plurality of casters comprises a lock arrangement to lock the corresponding caster to prevent movement of the base.

In an embodiment, the portable drum kit can include an outer cover to cover the one or more musical instruments, wherein one or more latches are provided with the outer cover to lock the outer cover with the base. The outer cover can include a handle fitted to an outer surface of the outer cover for easy handling of the drum kit, and one or more pockets on sides of the outer cover to store drum playing sticks, books, spare accessories, cables and other small items.

In an embodiment, the portable drum kit can include an extendable base to support a remote hi-hat pedal. The extendable base is pivotally coupled to the base to move between a folded position in which the extendable base is folded and an extended position in which the extendable base is positioned adjacent to the base to support the remote hi-hat pedal.

In an embodiment, the portable drum kit can include a throne for the percussionist to sit.

In an embodiment, the portable drum kit can include an audio interface for mics.

In another aspect of the present disclosure provides a portable drum kit includes a base; one or more musical instruments comprising one or more drums and at least one cymbal to be fitted on the base; one or more vertical columns fixed to the base to support at least one of the one or more musical instruments at a predefined height above the base; one or more modular brackets adapted for fitment with at least one of the one or more drums; and at least one pair of modular clamps adapted to enable fitment of the least one of the one or more drums and the at least one cymbal to the one or more vertical columns and/or horizontal column/beams.

In an embodiment, each of the one or more modular brackets can include a base bracket member configured for fitment to the at least one of the one or more drums, a holding member configured for fitment with base bracket member with assistance of a second wing nut, and having at least one hole, and a road member configured for fitment to the at least one hole of the holding member with assistance of a third wing nut.

In an embodiment, each of the at least one pair of modular clamps can include a double v-clamp to engage with one of the one or more vertical columns or one of the one or more rod members detachably coupled to the one more modular brackets or any other rod like structure, and at least one cylindrical coupling member having either a female coupling or a male coupling that is fitted on outer surface of the cylindrical coupling member to engage with the corresponding male coupling or female coupling of the corresponding modular clamp, and a first wing nut for connecting the at least one cylindrical coupling member with the double v-clamp. The at least one cylindrical coupling member can incorporate serration that engages with corresponding serration on the double v-clamp to allow coupling of the at least one cylindrical coupling member with the double v-clamp in different orientation along an axis of the corresponding modular bracket.

In an embodiment, the at least one cylindrical coupling member of each of the at least one pair of modular clamp can include at least one first cylindrical coupling member having a female coupling, and at least one second cylindrical coupling member having a male coupling to engage with the corresponding female coupling of the corresponding modular clamp. At least one of the at least one first cylindrical coupling member and the at least one second cylindrical coupling member can include serrations on any or both of a lower surface and an upper surface to enable engagement of the at least one first cylindrical coupling member with the at least one second cylindrical coupling member in different orientation along the axis of the respective modular clamp.

In an embodiment, a spare male coupling or female coupling of each of the at least one pair of modular clamps allow coupling with the corresponding female coupling or male coupling of another modular clamp to allow coupling of another musical instrument or or other elements/accessory, such as but not limited to, mic, music sheet holder and the like.

In an embodiment, the at least one pair of modular clamps can allow movement of the at least one of the least one of the one or more drums and the at least one cymbal between an collapsed position in which the least one of the one or more drums and the at least one cymbal are placed closer to each other, and a deployed position in which the least one of the one or more drums and the at least one cymbal are placed at desired positions to allow a percussionist to use the drum kit.

In an embodiment, the each of the one or more modular bracket can include at least one coupling member having either a female coupling or a male coupling to allow coupling of one or more other elements to the corresponding modular brackets. The at least one coupling member can be configured for fitment between the base bracket and the holding member.

In an embodiment, each of the one or more modular brackets can allow rotation of the respective drum along a first axis and a second axis of the respective modular bracket. The one or more rod members can be generally L-shaped. The rod members can move along the length of the vertical columns.

In another embodiment, the one or more rod members can be of any shape, for example, U-shaped, S shaped etc.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION

Figure 1A:
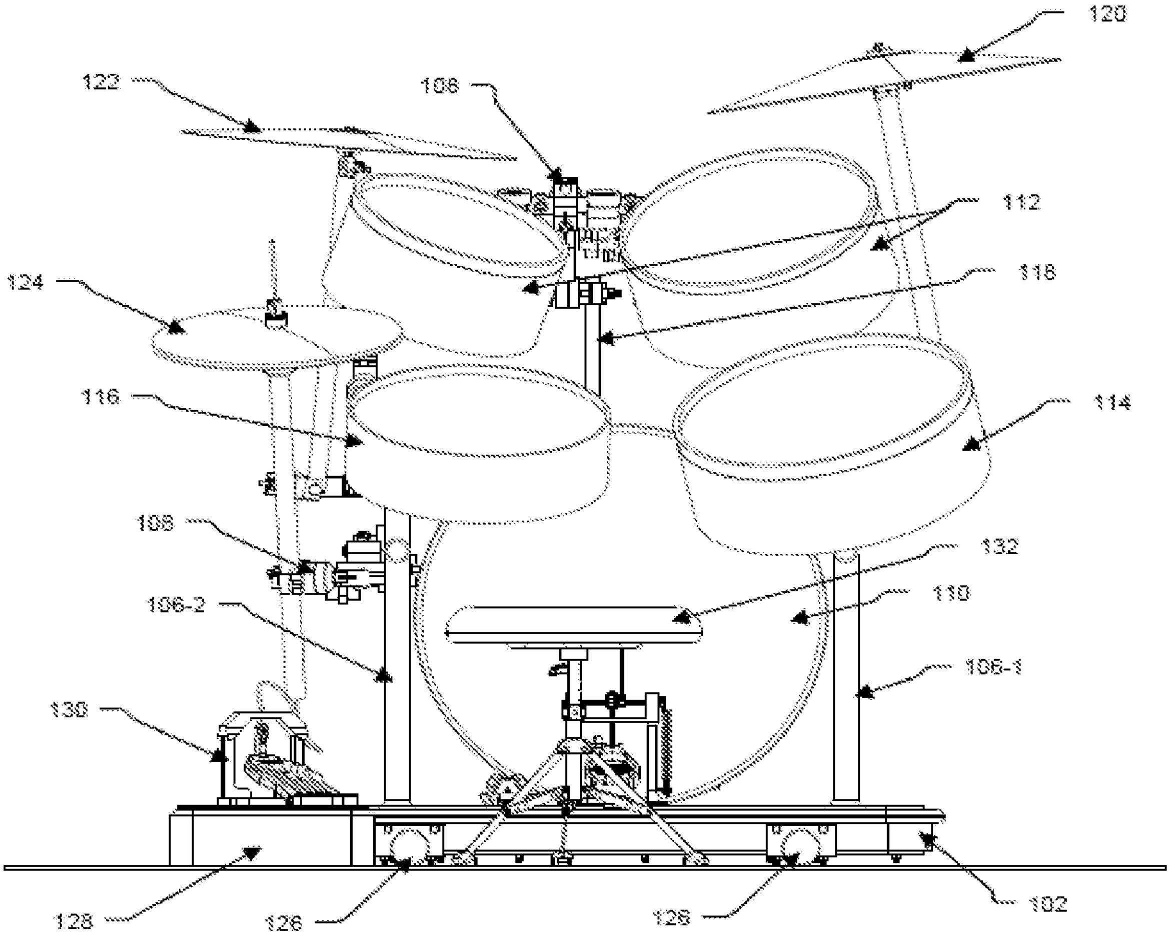
FIGS. 1A to 1F illustrate exemplary representations of different views of the proposed drum kit in open configuration, in accordance with embodiments of the present disclosure.
Figure 1B:
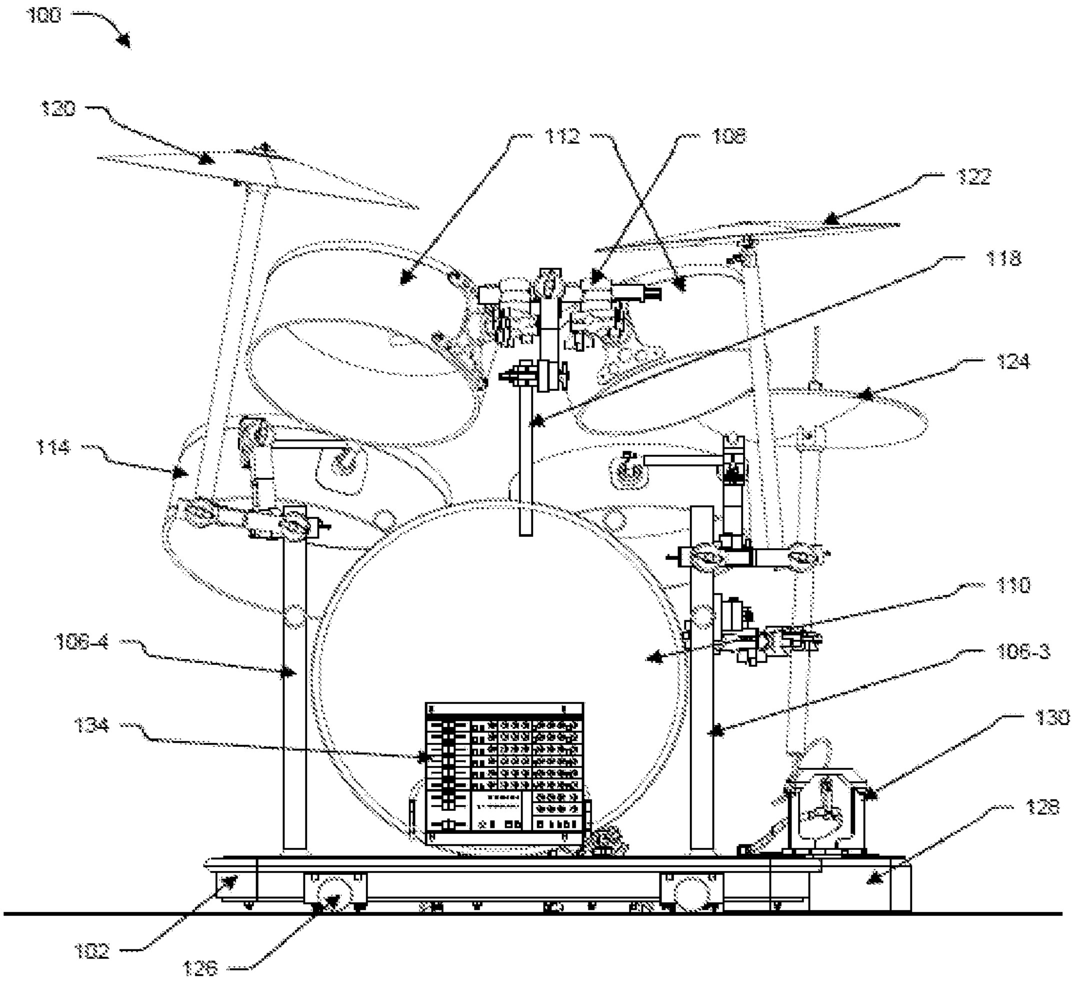
Figure 1C:
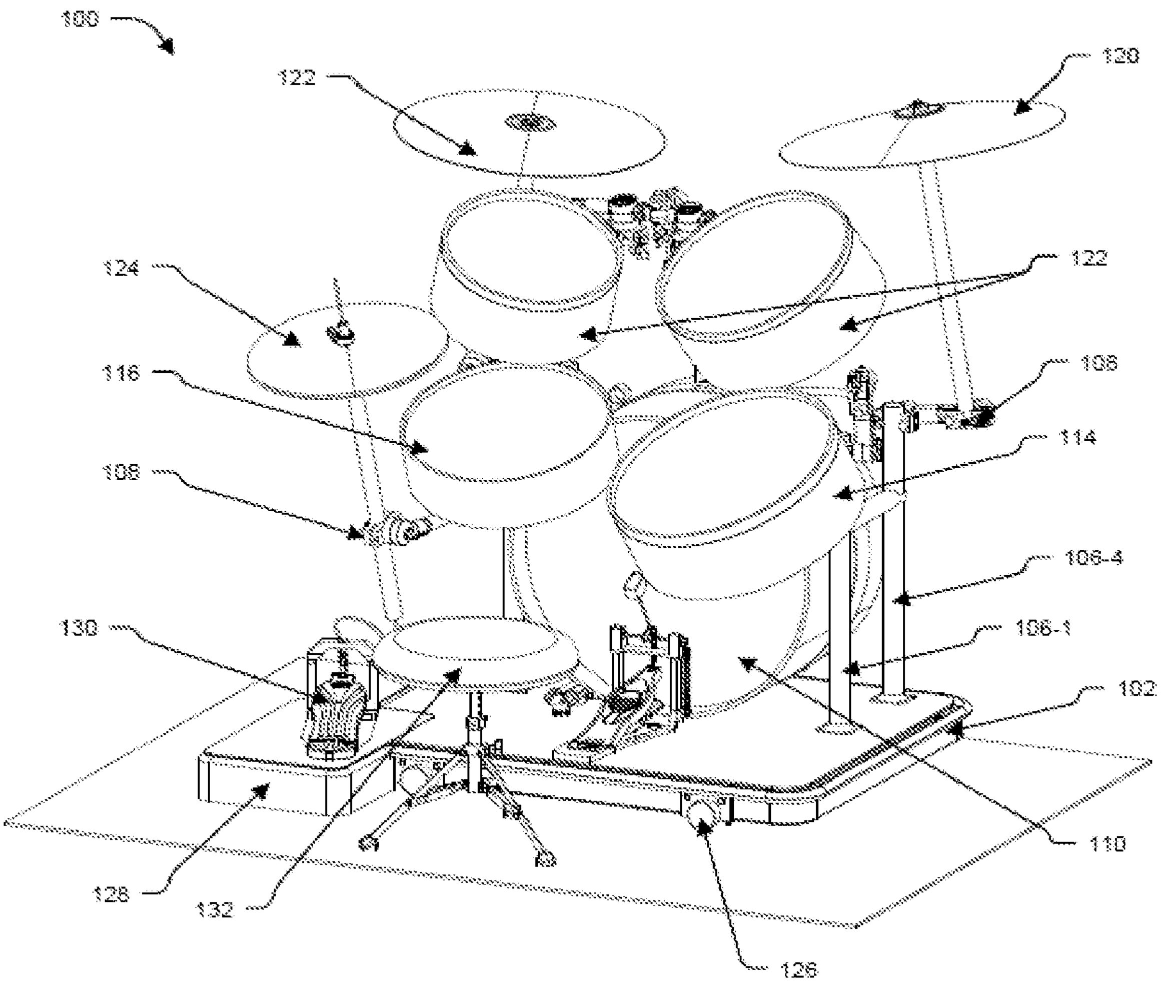
Figure 1D:
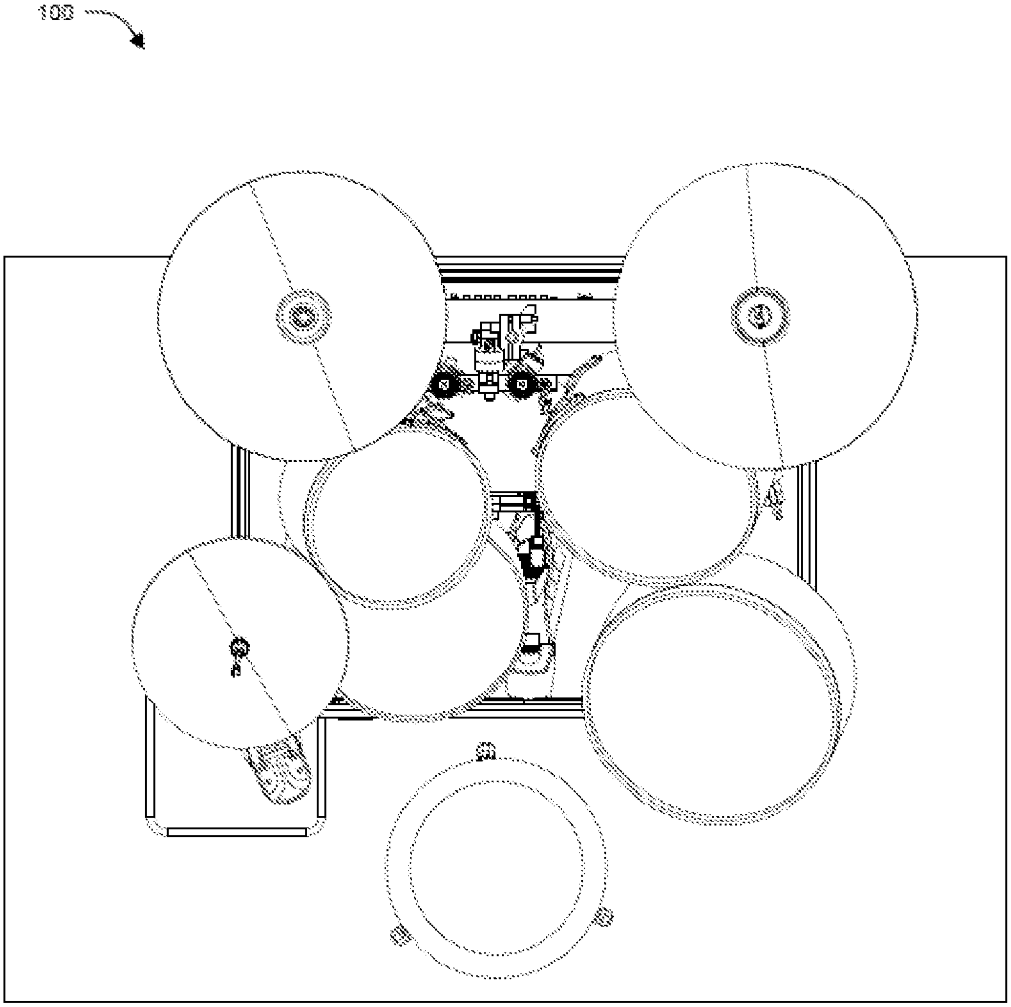
Figure 1E:
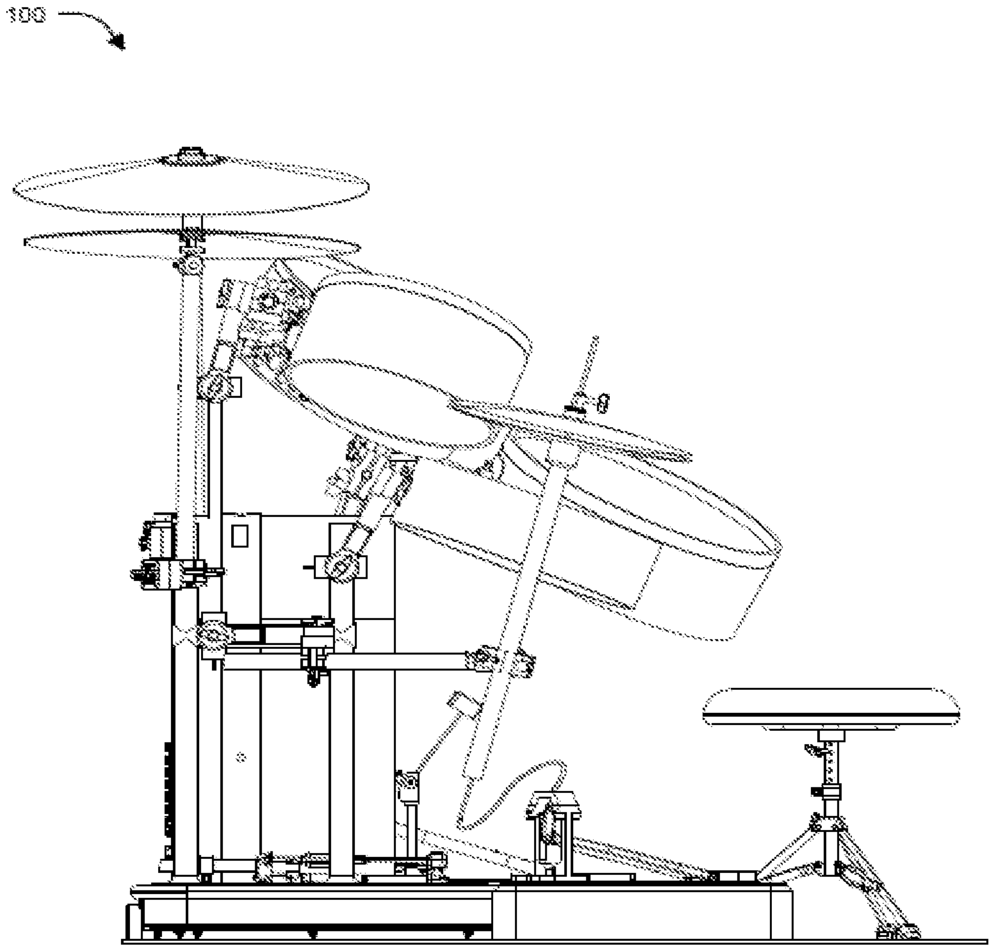
Figure 1F:
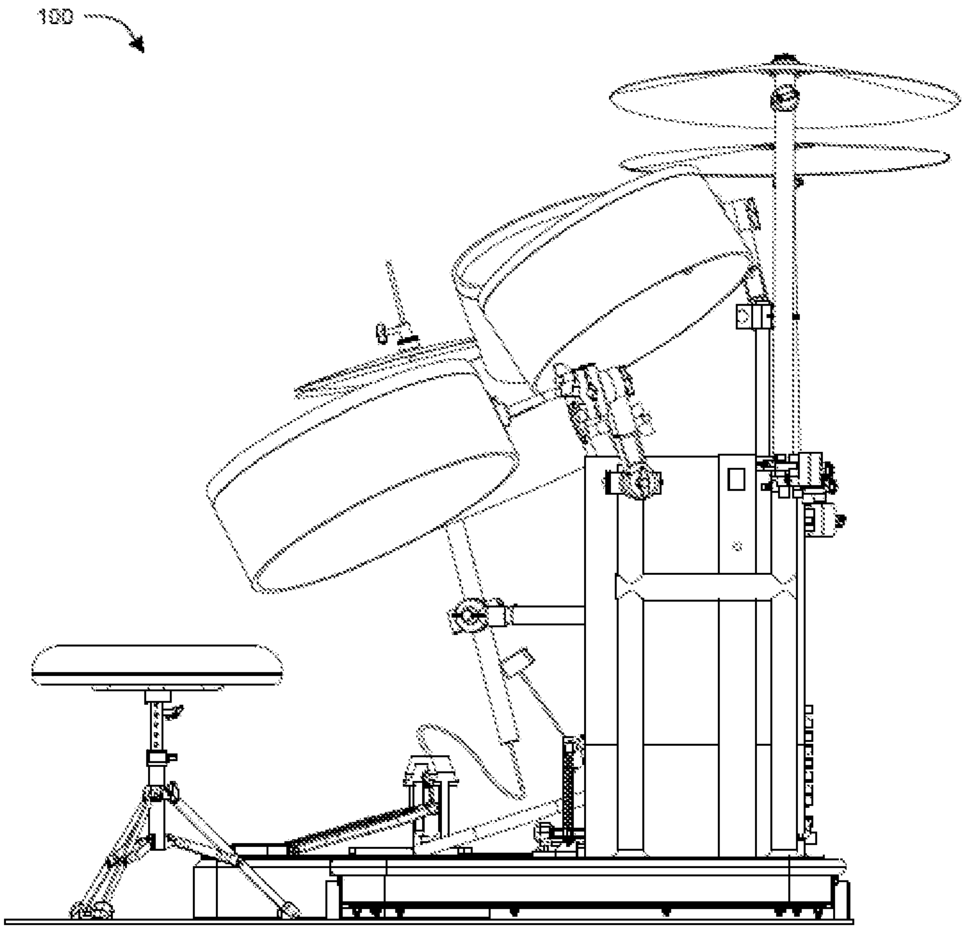
Figure 2A:
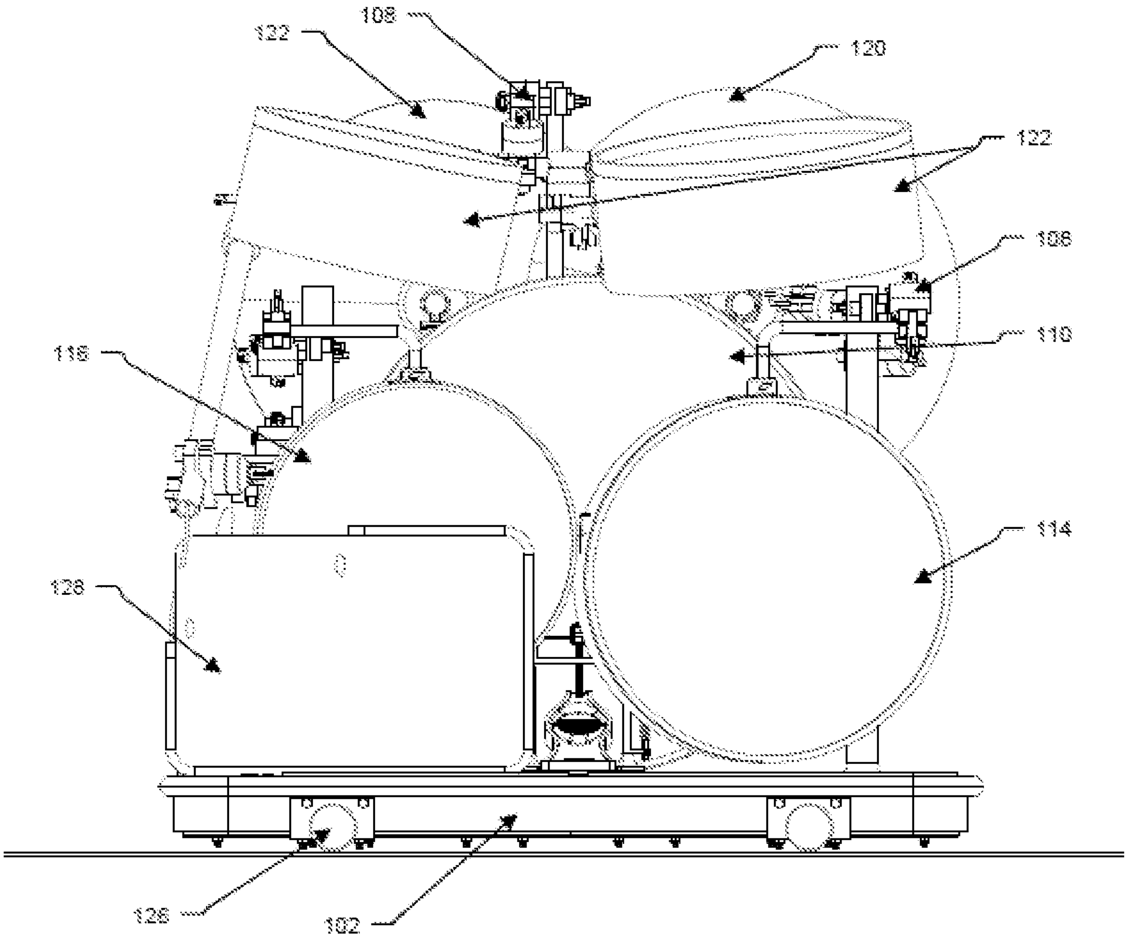
FIGS. 2A to 2D illustrate exemplary representations different views of the proposed drum kit in closed configuration, in accordance with embodiments of the present disclosure.
Figure 2B:
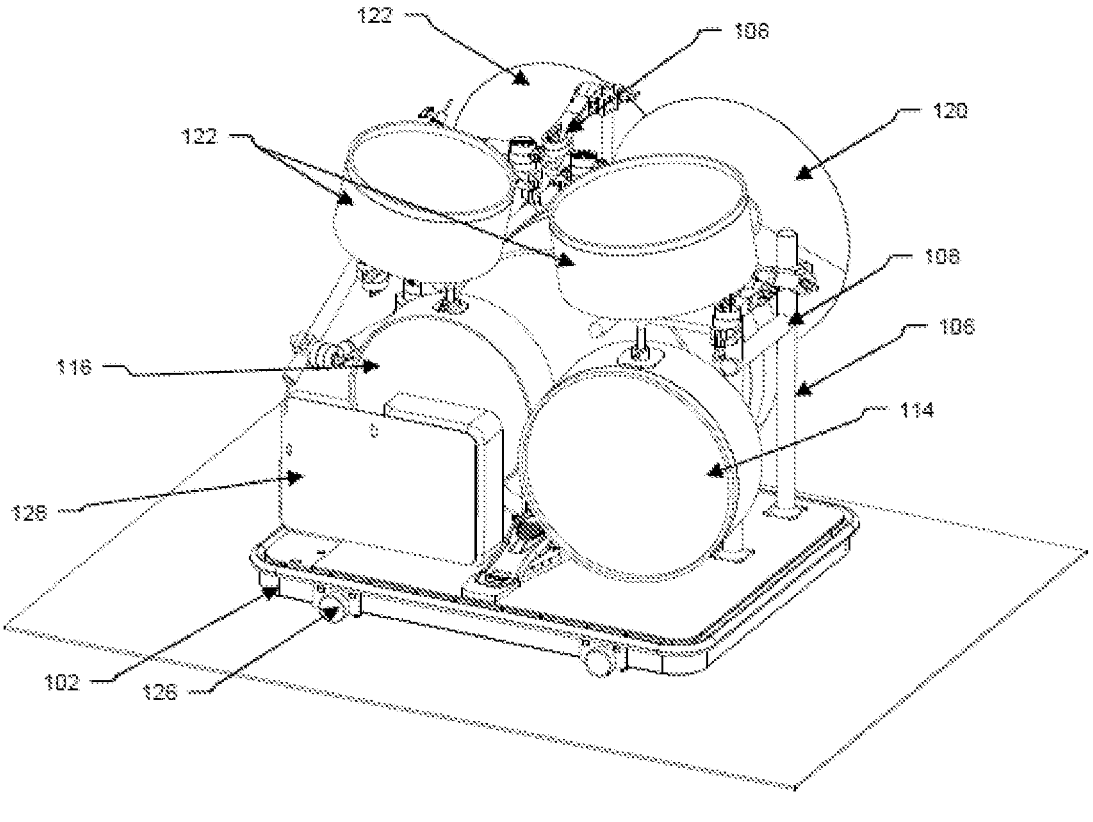
Figure 2C:
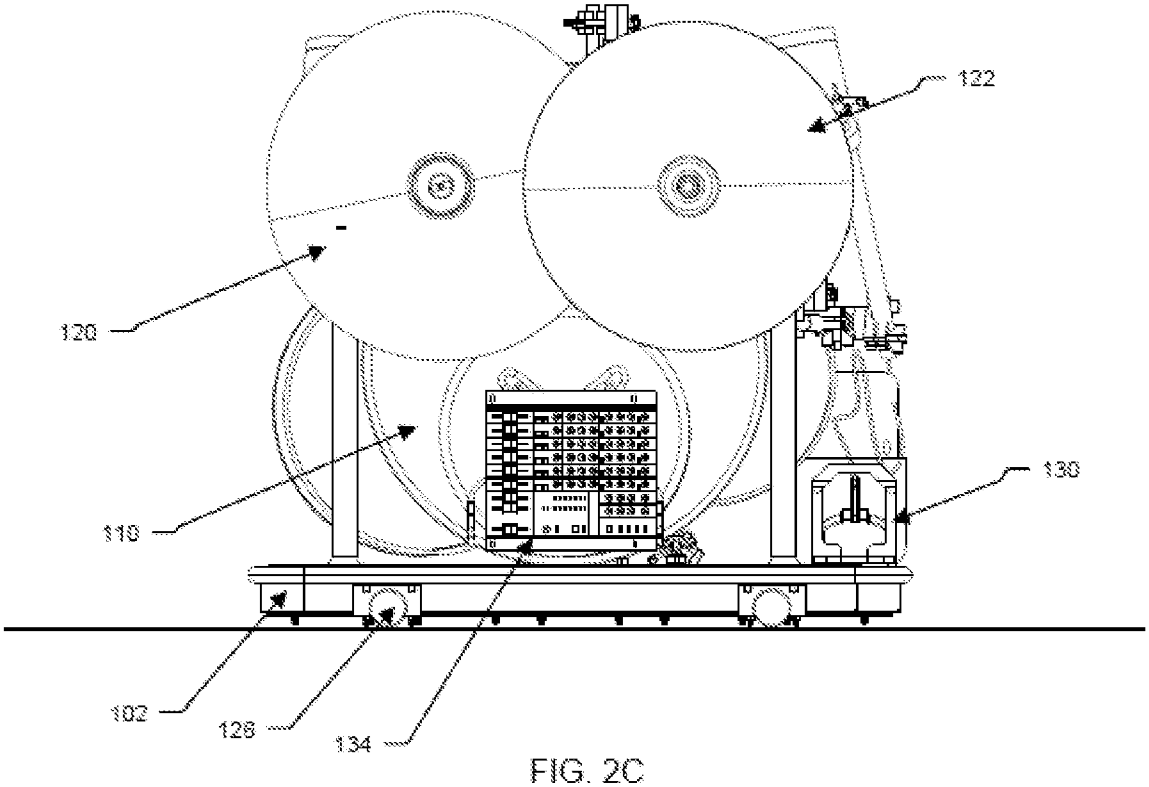
Figure 2D:
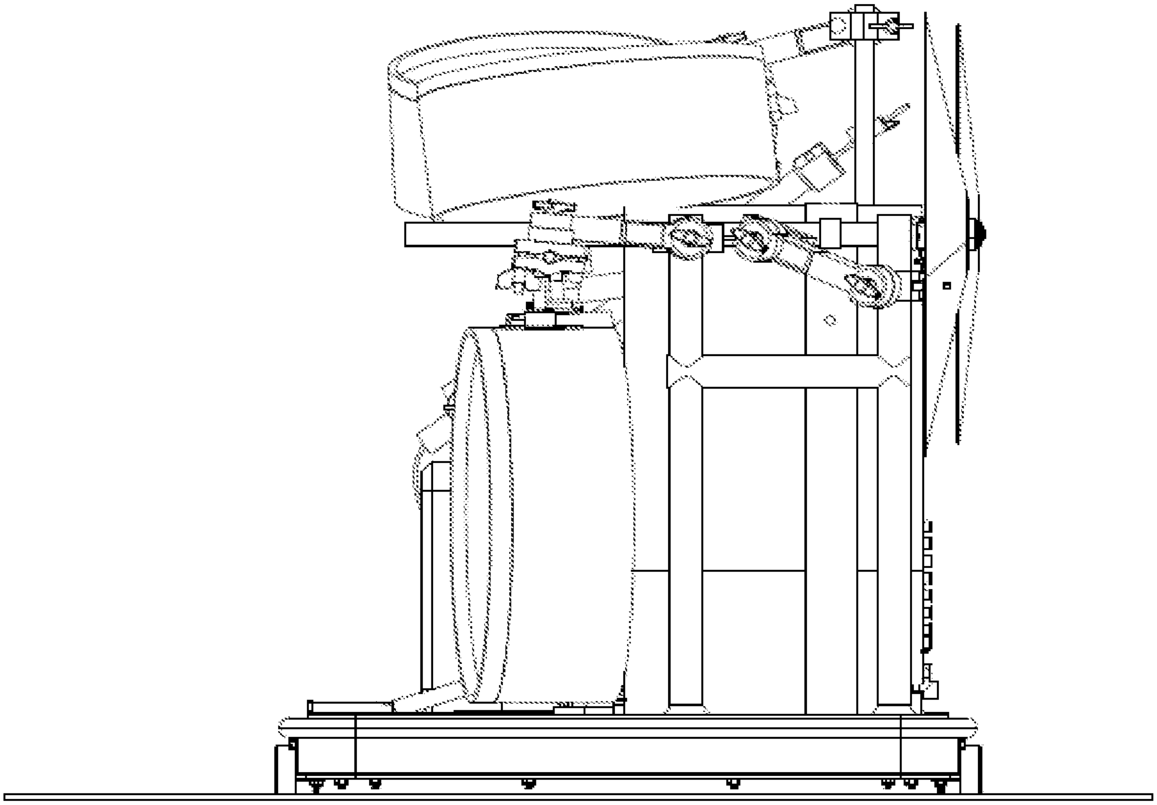
Figure 3:
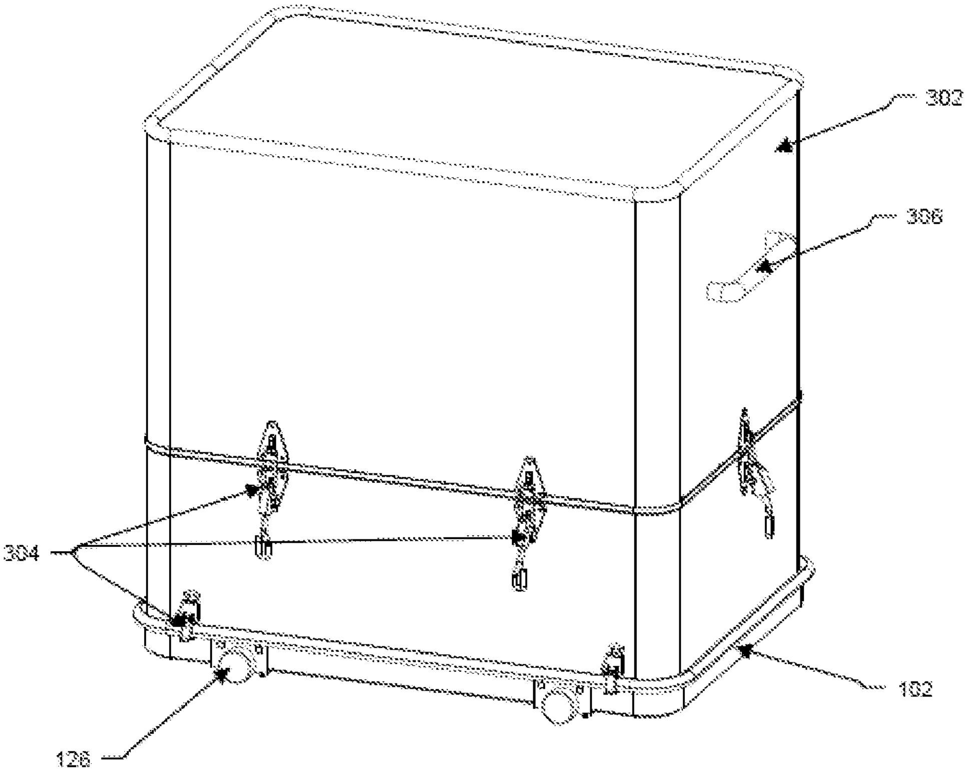
FIG. 3 illustrates an exemplary representation of the proposed drum kit with an outer cover, in accordance with an embodiment of the present disclosure.

The following is a detailed description of embodiments of the disclosure depicted in the accompanying drawings. The embodiments are in such details as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

If the specification states a component or feature "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. This disclosure may however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Various terms as used herein. To the extent a term used in a claim is not defined below, it should be given the broadest definition persons in the pertinent art have given that term as reflected in printed publications and issued patents at the time of filing.

Embodiments explained herein relate to musical instruments. Particularly, it pertains to a simple and cost effective portable drum kit. The present disclosure provides an efficient solution to the major problems associated with conventional drum kits. The disclosed drum kit maintains and sustains the same feel and experience of an acoustic drum kit, while being easy and quick to set-up/dismantle, convenient to transport, saving time, money and efforts.

In an embodiment, the disclosed drum kit solves a major problem faced by professionals and percussionists, which is related to dismantling; packing, transporting and assembling their drum kits, without risk of damaging or misplacing any component. The proposed drum kit eliminates need of expensive, cumbersome hard-cases for each component. Instead, it provides a better and cost-effective alternative as a single preassembled, ready to move, adjustable 5 pieces acoustic drumming solution or a product. Since all components are preassembled with assistance of fully adjustable clamps, the invention saves a huge amount of time spent during setup and repacking as well as while being transported.

Re-designing and modifying a drum kit in a manner which allows it to fit within a box, encasement or a cubic frame of metal with a combined outer dimension of less than 87 inches (length+height+depth) was challenging. This is done without compromising on the quality of the instruments and sound. A 5 pieces drum kit consists of 5 drums, one, three or more cymbals, cymbal stands and several other parts such as clamps to join and assemble them. Majority of them vary in size and are oddly shaped. Hence, their typical structures have made it difficult for even skilled professionals to confine them in a box/frame, without increasing its size and weight till an extent where it becomes too cumbersome to transport. Furthermore, all parts are delicate and have a risk of parts being touching/fouling/rubbing against each other, which could result in damage. Creating a drum kit wherein all parts fit in a compact, lightweight carry-box/frame and still do not rattle and get damaged in transportation. In addition, it was challenging to create a drum kit which can be assembled and repacked by the percussionist alone with minimal time and effort. Another challenge was to create a drum kit which takes minimum stage space, which is valuable as it is also used by other performers. Moreover, different percussionists are of different sizes and heights and it was challenging to arrange kit which do not take away or restrict fluid movements made by the percussionists. Therefore, all drums, cymbals, pedals, hi-hats etc. remain adjustable for percussionist of all sizes and height while respecting their varying playing style and preferences.

The present disclosure eliminates all that hassle associated with the conventional drum kits as all components fit within a box/frame with wheels which can be effortlessly transported even by a single person. Since there is minimal disassembly and assembly involved, the risk of components being misplaced is close to none. Despite being clamped on to support members, all drums and cymbals are adjustable in order to provide a satisfactory drumming experience to drummers of all sizes and playing styles. Value for money is always what customers want, especially in the music industry. Buying hard-cases for a basic 5-piece acoustic drum kit costs as much as buying a kit itself, while non-musical components of disclosed drum kit (such as rod members, clamps, wheels, etc.) add only about 25% of the actual kit cost. Hence, the present invention is a far more effective alternative while costing approximately 75% less as compared to buying all these components separately and when comparing the costs associated in/with storing, packing and transporting. Thus, the proposed drum kit is economical, affordable, convenient, easy to transport, easy to handle, assemble and pack, without fear of damage or losing any part as well as saves time and efforts of the percussionist.

The proposed drum kit can be handled, used, assembled, packed, transported by one person without help of any other person. Easy to carry in flights as check in bag. Easy to carry on stairs or roads. It can be made in many variations with different materials according to need of a percussionist. It is durable having shelf life of years. In short, the proposed drum kit can create revolution in the musical industry and markets of musical instruments, specifically drum kits.

Referring from FIG. 1A to FIG. 3 where the proposed drum kit assembly in open configuration, closed configuration and with an outer cashing are shown, the proposed drum kit assembly 100 can include a base 102 and one or more musical instruments include one or more drums and at least one cymbal to be fitted on the base 102, one or more vertical columns, such as but not limited to a vertical column 106-1, 106-2, 106-3 and 106-4 (collectively vertical columns 106) fixed to the base 102 to support at least one of the musical instruments at a predefined height above the base 102; one or more rod members 502 (shown in FIGS. 5B to 5E) detachably coupled to the one or more musical instruments; and a plurality of pair of modular clamps 108 (hereinafter, individually referred to as modular clamp 108, and collectively referred to as modular clamps 108) adapted to enable fitment of the least one of the one or more drums and the at least one cymbal to the vertical columns and/or horizontal column/beams.

In an embodiment, the one or more drums can include a bass drum 110 fitted on the base 102, rack toms 112 including mid tom and a high tom, a floor tom 114 and a snare drum 116. The rack toms 112 are supported on the bass drum 110 with assistance of a road 118 and modular clamps 108. The floor tom 114 and the snare drum 116 are mounted on the respective vertical columns 106 at predefined or desired heights above the base 102 with assistance of the modular clamps 108.

In an embodiment, the at least one cymbal can include a crash cymbal 120, a ride cymbal 122 and a hi-hats cymbal 124. The crash cymbal 120 and the ride cymbal 122 are mounted on the mounted on the respective vertical columns 108 at the predefined or desired heights above the base 102 with assistance of the modular clamps 108 and rod like structures. The hi-hats cymbal 124 is also mounted on the respective vertical column 106 at the desired position with assistance of the modular clamps 108 and the rod like structure.

In an exemplary embodiment, drum dimensions can be: bass drum 110—20×9 inches, floor tom 114—14×5 inches, snare drum 116—13×3 inches, high tom—10×5 inches and the mid tom—12×5 inches.

In an exemplary embodiment, the base 102 can be a wooden base with dimensions of 27.5×29 inches. In another exemplary embodiment, the base 102 can be a wooden base with dimensions of 24.8×34.5 inches. In another embodiment, the base 102 can be made of polymeric material or metallic material such as aluminium, polycarbonate, ABS, polypropylene and the like.

In an embodiment, the base 102 can include a plurality of wheels or casters 126 configured on a lower surface of the base 102 to allow movement of the base 102. Each of the plurality of casters 126 can include a lock arrangement to lock the corresponding caster to prevent movement of the base 102. The locking arrangement for the casters facilitates stability for a percussionist while playing the drums and movability for transportation. The casters 126 can also add 4 inches of height to the base 102, which not only make it portable but it also saves the wooden base from getting wet in case of spillage of any liquid or during rain if the floor is wet and thus indirectly protects the drum sets 100.

In an embodiment, an extendable base 128 can be provided to support a remote hi-hat pedal 130. The extendable base 128 can be pivotally coupled to the base 102 to move between a folded position in which the extendable base 128 is folded (shown in FIGS. 2A and 2B) and an extended position in which the extendable base 128 is positioned adjacent to the base 102 (shown in FIGS. 1A to 1C) to support the remote hi-hat pedal 130.

In another embodiment, one or more additional extendable bases to increase the footprint of the base for any reason.

In an embodiment, the portable drum kit 100 can include a throne 132 for the percussionist to sit.

In an embodiment, the portable drum kit 100 can include an audio interface 134 for mics of the drum kit 100.

In an embodiment, the portable drum kit 100 can include an outer cover 302 (shown in FIG. 3) to cover the musical instruments. One or more latches 204 are provided with the outer cover 302 to lock the outer cover 302 with the base 102. The outer cover 302 can include a handle 306 fitted to an outer surface of the outer cover 302 for easy handling of the drum kit 100.

In an embodiment, the handle 306 can be a telescopic handle fitted on one side of cover can convert whole drum kit 100 in to a trolley bag easy to be transported and carry without feeling weight of the drum kit 100.

In an embodiment, one or more pockets (not shown) can be provided on sides of the outer cover 302 to store drum playing sticks, books, spare accessories, cables and other small items.

In an embodiment, the outer cover 302 can be made of polymeric material or wooden martial or any other suitable hard material walls/panels forming an encasement from all sides giving it a box structure depending on the budget and preference of the percussionist. This outer cover 302 can be opened and spread on floor to give additional flooring which can be useful when the stage or floor are not comfortable or can be separated and kept aside if not required while playing.

In an embodiment, the modular clamps 108 can allow movement of the at least one of the drums and the cymbals between a collapsed position or closed position (shown in FIG. 2A to 2D) in which the drums and the cymbals are placed closer to each other, and a deployed position (shown in FIGS. 1A to 1F) in which the drums and the cymbals are placed at desired positions to allow a percussionist to use the drum kit 100.

In an embodiment, the portable drum kit can include one or more modular brackets (shown in FIGS. 5A to 5E) to enable coupling of the one or more rod members to the one or more musical instruments such as drums. The one or more rod members are generally L-shaped.

In an embodiment, the modular clamps 108 and the modular brackets can be designed for a quicker, easier and faster set-up and packing process as they can be adjusted by turning their wing-nuts. Once the clamps is loosened, one can adjust the particular component in the desired position and tighten the clamp using the corresponding wing-nut. Unlike other clamps, the modular clamps 108 and the modular brackets offer close to 360 degrees adjustment, which is better for the musical instruments.

In an embodiment, for set-up, the clamps 108 have to be loosened by turning the respective wing nuts in a direction, adjusted in playing position and then tightened by turning the respective wing nuts in opposite direction. As the bass drum 110 is stored in a different spot, it has to be pulled out a few inches in order to play. The drum pedal, which is fastened to the base 102 using Velcro, has to be removed and attached to the bass drum 110. The hi-hat stand is collapsed and fastened vertically to the corresponding vertical column 106. It has to be removed and set-up separately. All cymbals 120, 122 and hi-hats 124 are moved from resting or storage position inside the bass drum 110 to the designated or desired positions. Remove the hi-hat cymbals 124 and throne seat top from the storage unit at the back of the bass drum 110. Remove the cymbals from the locked positions. Move the extended base 128 from the folded position to the deployed position In an embodiment, components of the drum kit 100 have to be packed the same way as they were opened up, by adjusting the modular clamps 108 and the brackets. The bass drum 110 has to be moved to its storage spot. The cymbals 120,122 and 124 should be removed and stored inside the bass drum 110. A hi-hat stand and bass pedal are attached to the base 102 at their respective storage locations. The bass pedal is used to play the bass drum. Move the extended base 128 to the folded position.

In an embodiment, the dimensions of the drum kit 100 can be reduced (more compact) in such a way that the total length+height+width can be closer to 62 inches; this allows it to be suitable as checked-in luggage on a flight. This may revolutionise drum transportation.

In an embodiment, the outer cover 302 can have five panels/walls totally removable before playing or can be spread over to the floor creating additional cover of floor. These panels/walls can be constructed out of reinforced plastic, fibre glass, carbon fibre, aluminium or wood or polycarbonate ABS and polypropylene or any other similar material. These panels can be designed to completely encase. When the panels are locked into place it will not only protect all the components of the drums set 100 but also ensure no water, or dust can go in. The panels can be designed to be dismantled and assembled quickly and managed by one person only. The panels can have inbuilt ribs or embossed elements that gives strength and stability.

For a person to play the drum kit 100 requires to open the outer cover 302, loosen the clamps 108 and adjust the drums, cymbals and other components outward and tighten the clamps 108 again. Similarly, to pack the drum kit 100, the clamps 108 need to be loosened and components need to be repositioned in the collapsed position. It may takes about 10-15 minutes by a single person to pack or open the drums kit 100 (and components) for playing compared to a conventional drum kit, which requires 30-45 (or more) minutes to assemble and to dismantled and packed by one person. The cover 302 has to be put on to complete the packing process. With the cover on, and wheels unlocked, the drum kit is ready to be transported.

In an embodiment, the vertical columns 106, rod members, and other road like structure of the drum kit 100 itself can be made of strong and light materials such as; aluminium, stainless steel, carbon fibre or mild steel. Making it much lighter.

In an embodiment, the drum kit 100 can be designed as a "plug and play" drum kit, microphones can be pre-fitted at appropriate positions, all of which then further be connected to a junction box or audio interface 134. Power can be supplied and the audio interface can directly be connected to the venue's sound system. This way, microphones at the venue can be used by other performers. This may substantially reduce the time wasted during audio set-up and sound checks. Additionally, this will lead to a tidy stage and good cable management.

Referring from FIG. 4A to 4E, where a modular clamp (s) of the proposed drum kit is shown. The modular clamp 108 can include a double v-clamp 402 to engage with one of the columns 106 or one of the rod members 502 (shown in FIG. 5B) detachably coupled to the musical instruments such as drums, or any other rod like structure, at least one first cylindrical coupling member, such as a first cylindrical coupling member 404 having a female coupling 406, and at least one second cylindrical coupling member such as a second cylindrical coupling member 408 having a male coupling 410 to engage with the corresponding female coupling of the corresponding modular clamp to define a pair of clamps 108 (shown in FIG. 4B). Any of the first cylindrical coupling member 404 or the second cylindrical coupling member 408 can be engaged to the double v-clamp 402. The modular clamp 108 also include a first wing nut 412 for connecting the first cylindrical coupling member 404 and the second cylindrical coupling member 408 with the double v-clamp 402.

Figure 4A:
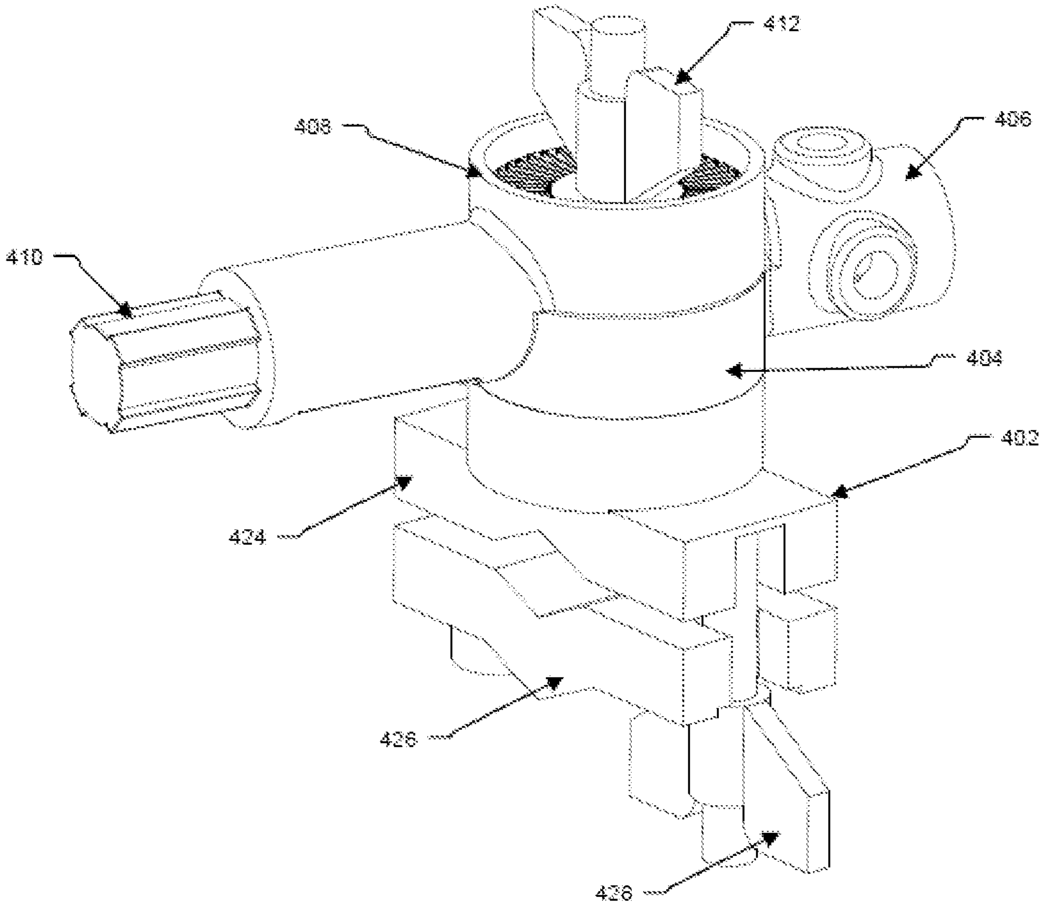
FIGS. 4A and 4B illustrate exemplary representations of a modular clamp and a pair of modular clamps respectively of the proposed drum kit, in accordance with embodiments of the present disclosure.
Figure 4B:
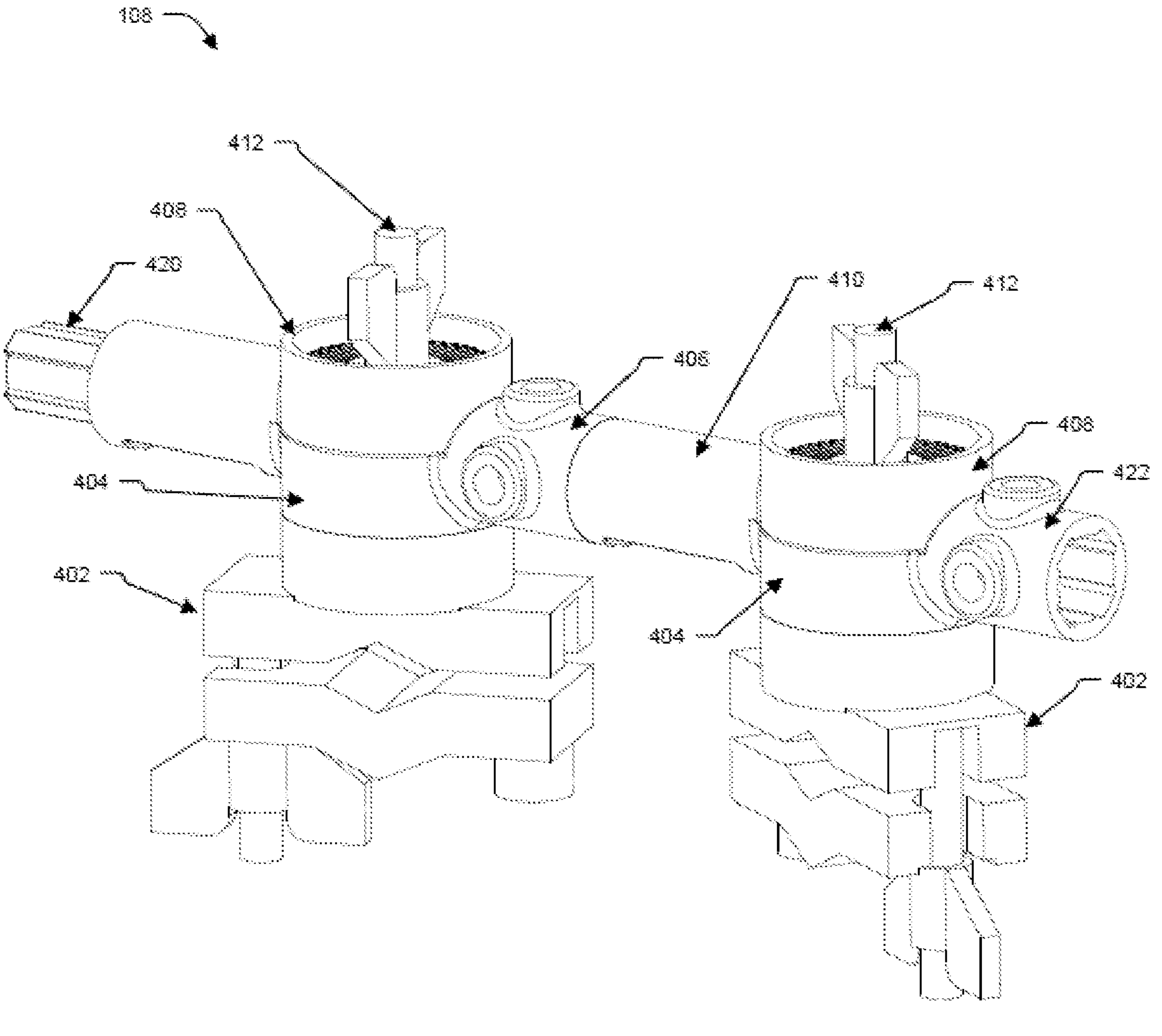
Figure 4C:
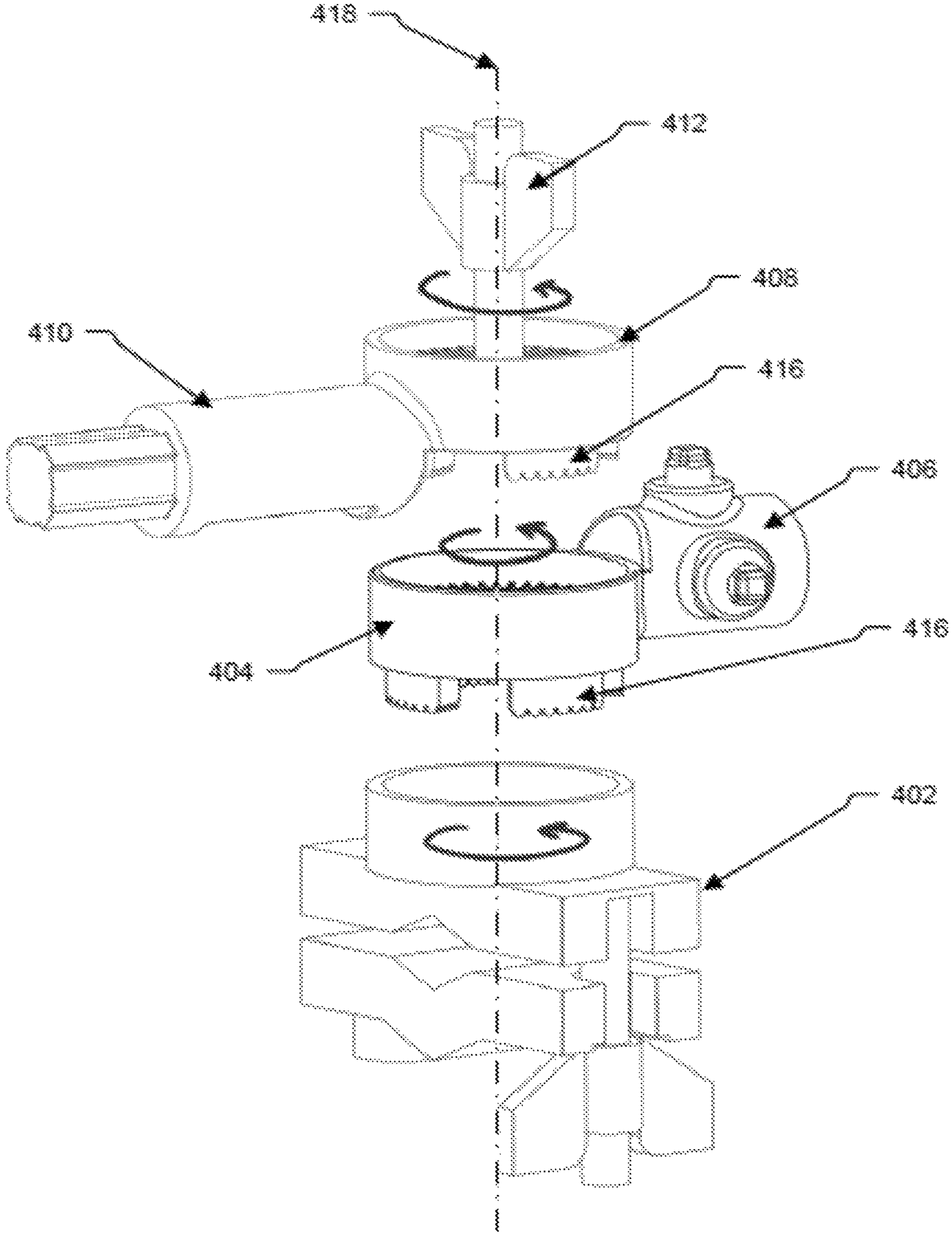
FIGS. 4C and 4D illustrate exemplary exploded views of a modular clamp of the proposed drum kit, in accordance with embodiments of the present disclosure.
Figure 4D:
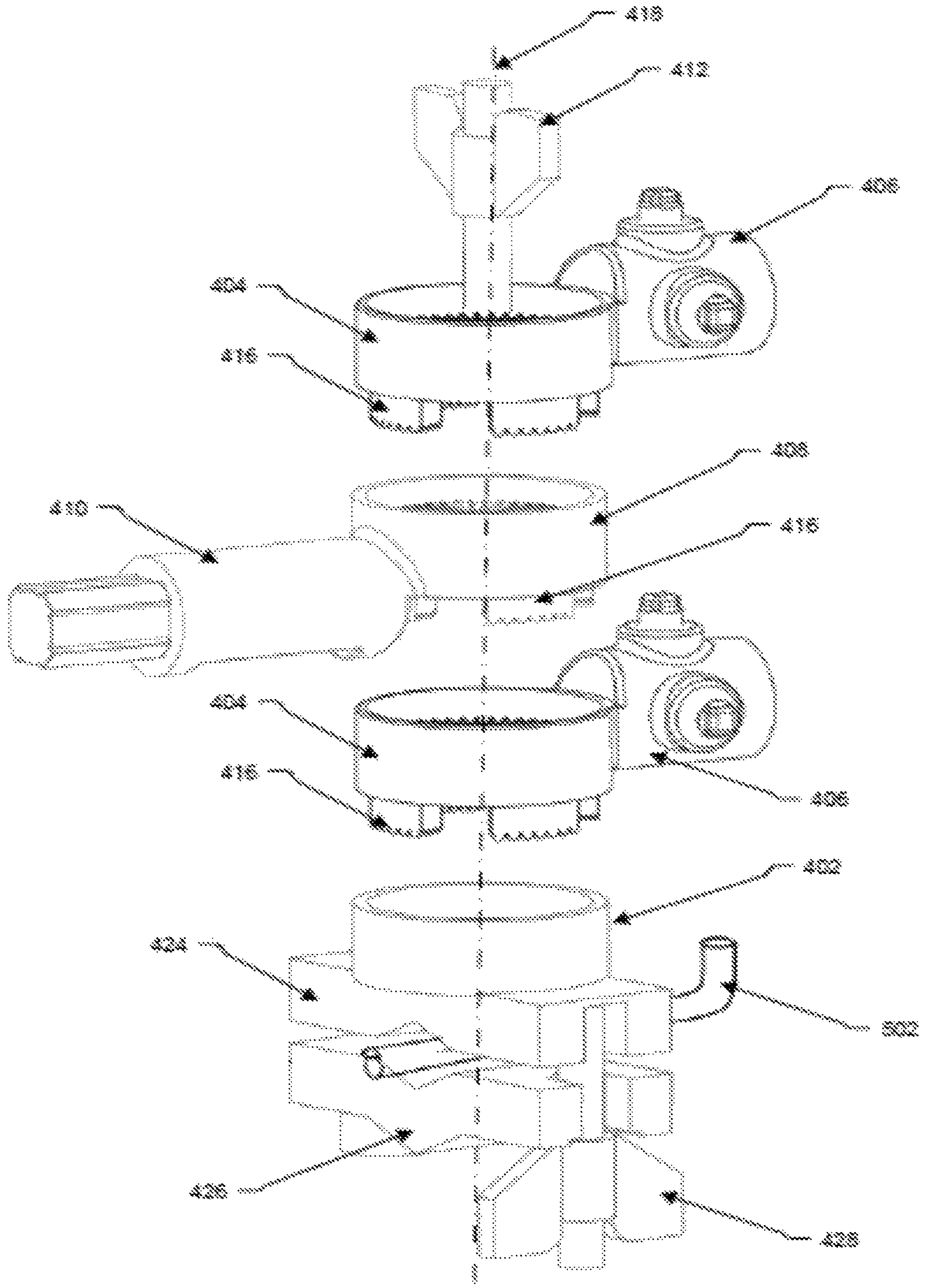
Figure 4E:
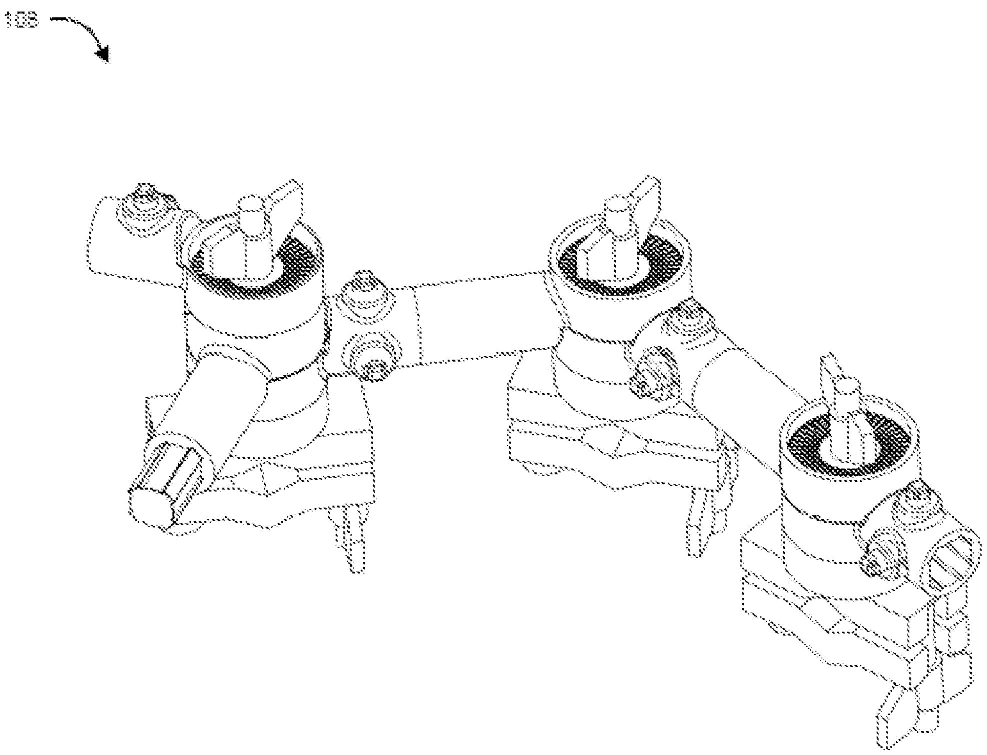
FIG. 4E illustrates exemplary working of a modular clamp of the proposed drum kit, in accordance with an embodiment of the present disclosure.

In another embodiment, the modular clamp 108 can include, but not limited to, the first cylindrical coupling member 404 and a pair of second cylindrical coupling member 404 and one the double v-clamp 402 (shown in FIG. 4D).

In another embodiment, the modular clamp 108 can include any numbers of the first cylindrical coupling member 404 and the second cylindrical coupling member 408.

In an embodiment, the first cylindrical coupling member 404 and the second cylindrical coupling member 408 having serrations 416 on any or both of a lower surface and an upper surface to enable engagement of the first cylindrical coupling member 404, the second cylindrical coupling member 406 and the double v-clamp 402 with each other in different orientation along an axis 418 of the respective modular clamp 108.

In an embodiment, a spare male coupling 420 or a spare female coupling 422 of the pair of modular clamps 108 allow coupling with the corresponding female coupling or male coupling of another modular clamp to allow coupling of another musical instrument or other elements/accessory, such as but not limited to, mic, music sheet holder and the like. This also allow extension of length of a group of modular clamps 108 as per requirement (shown in FIG. 4E).

In an embodiment, the male coupling 410 and the female coupling 406 of the corresponding modular clamps 108 are joined with assistance of lock nuts. The lock nuts of the pair of modular clamps 108 allow angular rotation or adjustment of the one modular clamp 108 with the corresponding modular clamps 108 as per requirement.

In an embodiment, the double V-clamp 402 of the modular clamp 108 can include an upper member 424, a lower member 426 and a lock wing nut 428 to enable tightening or loosening of the double V-clamp.

In an embodiment, the modular clamps 108 allow movement of the drums and the cymbals between the collapsed position in which the drums and the cymbals are placed closer to each other, and the deployed position in which the drums and the cymbals are placed at desired positions by loosening and/or tightening of the first wing nut 412, lock wing nut 428 and the lock nuts joining the male coupling 410 and the female coupling 406.

In an embodiment, assembly of clamp may allow the connected musical instrument to move in at least 3 planes (at least 2 and maximum 6), and also allow the musical instruments to face normal (perpendicular) to the player.

Referring from FIGS. 5A to 5E, where a modular bracket of the proposed drum kit 100 is shown. The modular brackets 500 can be configured for fitment with a drum to enable coupling of the one or more rod members such as a rod member 502 to the one or more musical instruments such as drums. The rod members 502 can be generally L-shaped.

In another embodiment, the rod members 502 can be of any shape, for example, U-shaped, S shaped etc.

In an embodiment, each of the modular brackets 500 can include a base bracket member 504 configured for fitment to the drum of the drum kit 100 and a holding member 506 configured for fitment with base bracket member 504 with assistance of a second wing nut 508. The holding member 506 can incorporate at least one hole such as a hole 510 for fitment of the corresponding rod member 502 with assistance of a third wing nut 512.

In an embodiment, the each of the one or more modular bracket can include at least one coupling member such as coupling member 514 having a male coupling 410 to allow coupling of one or more other elements to the corresponding brackets 500. The coupling member can be configured for fitment between the base bracket 504 and the holding member 506.

Figure 5A:
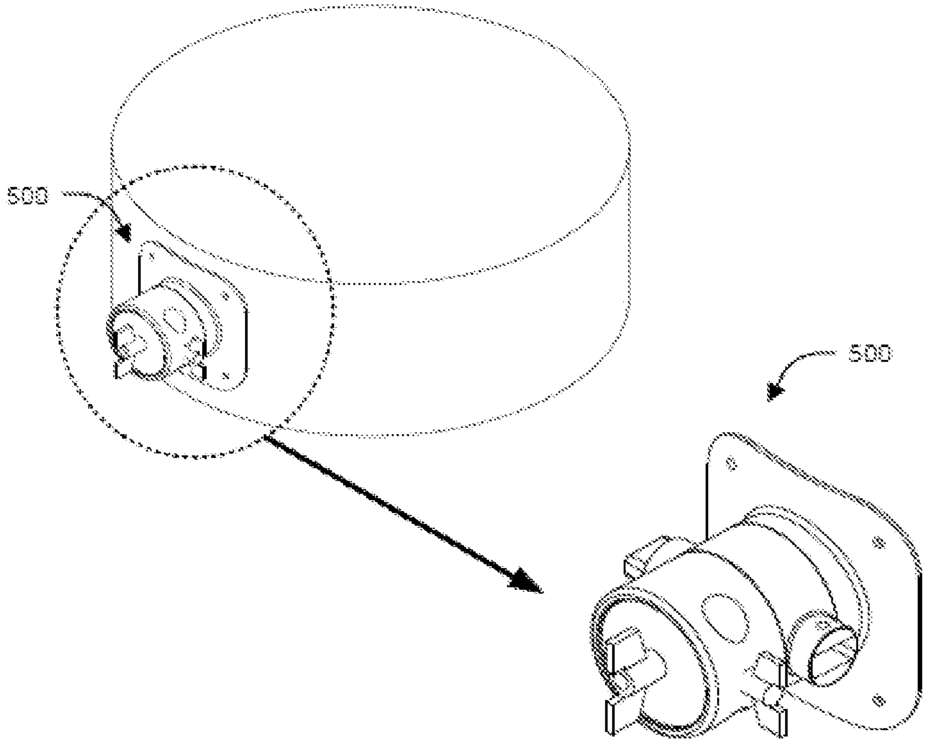
FIGS. 5A and 5B illustrate exemplary representations of a modular bracket of the proposed drum kit, in accordance with embodiments of the present disclosure.
Figure 5B:
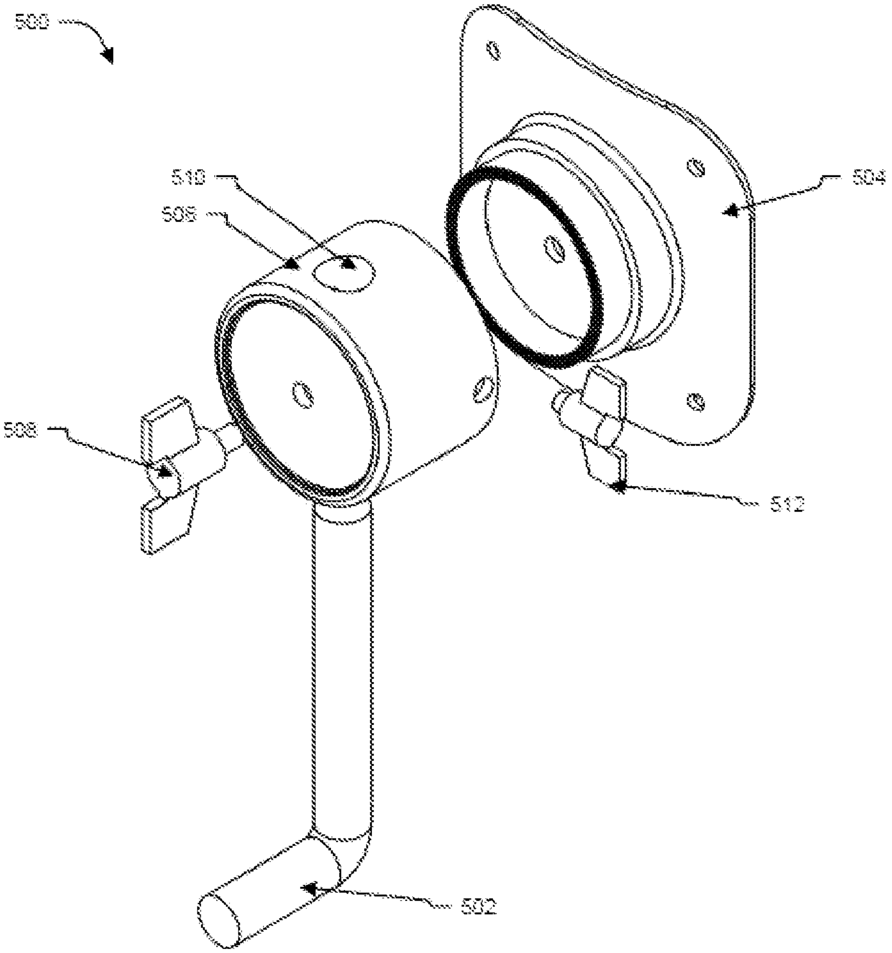
Figure 5C:
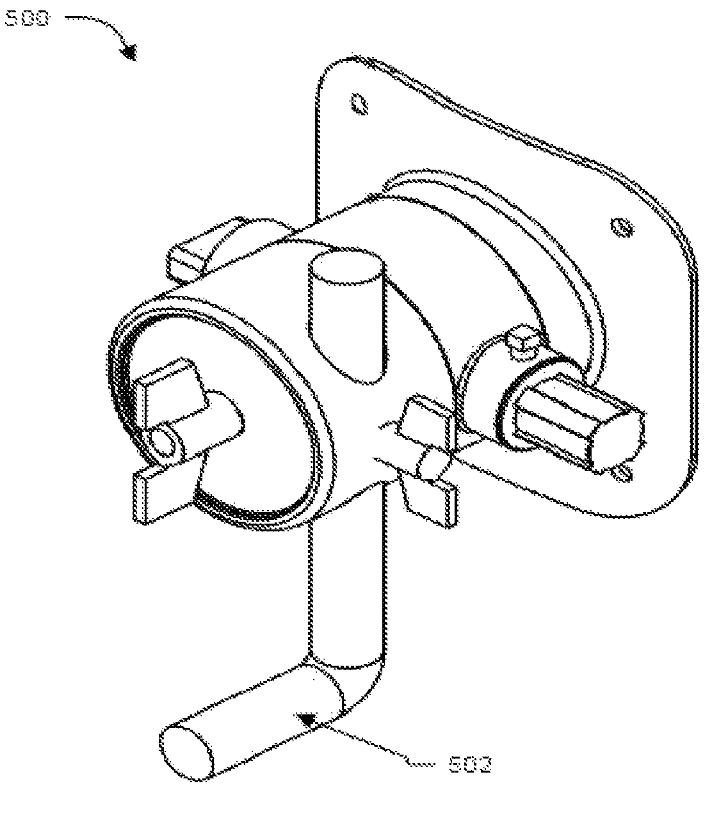
FIGS. 5C and 5D illustrate exemplary exploded views of a modular bracket of the proposed drum kit, in accordance with embodiments of the present disclosure.
Figure 5D:
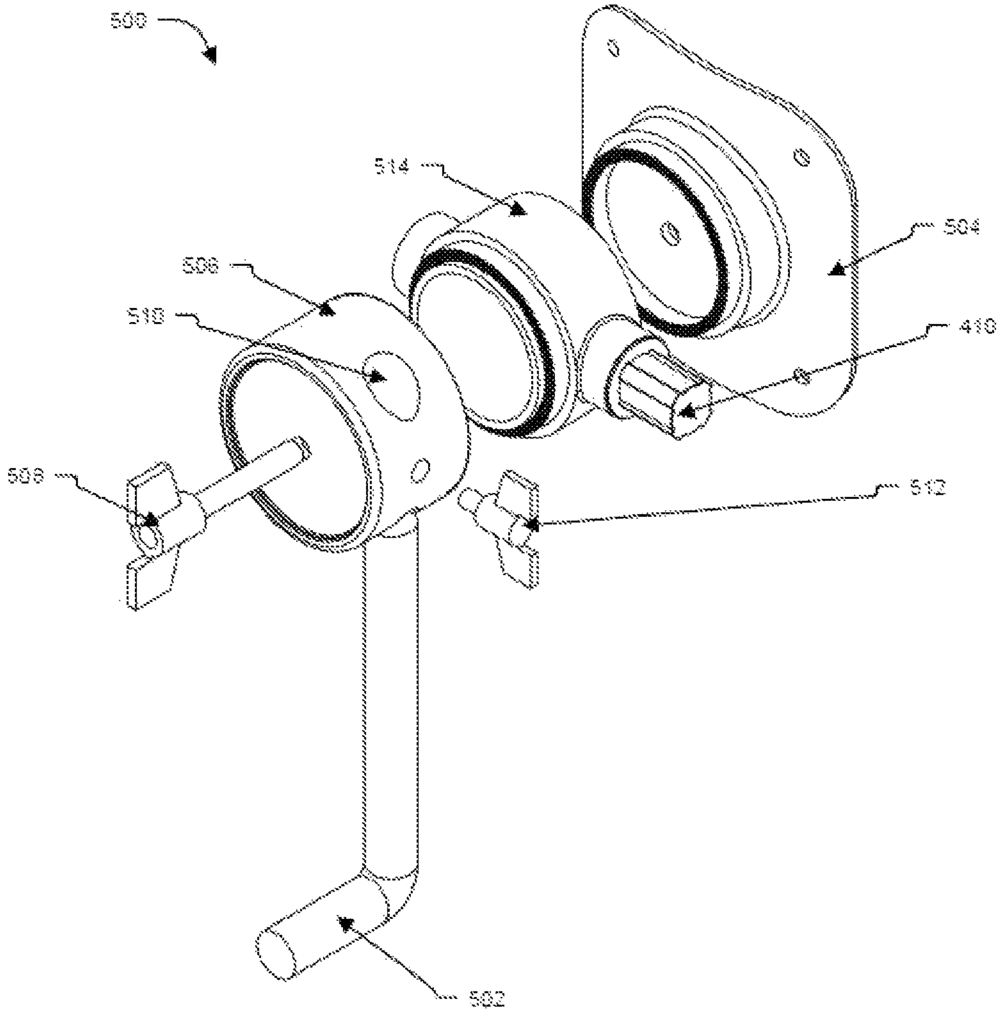
Figure 5E:
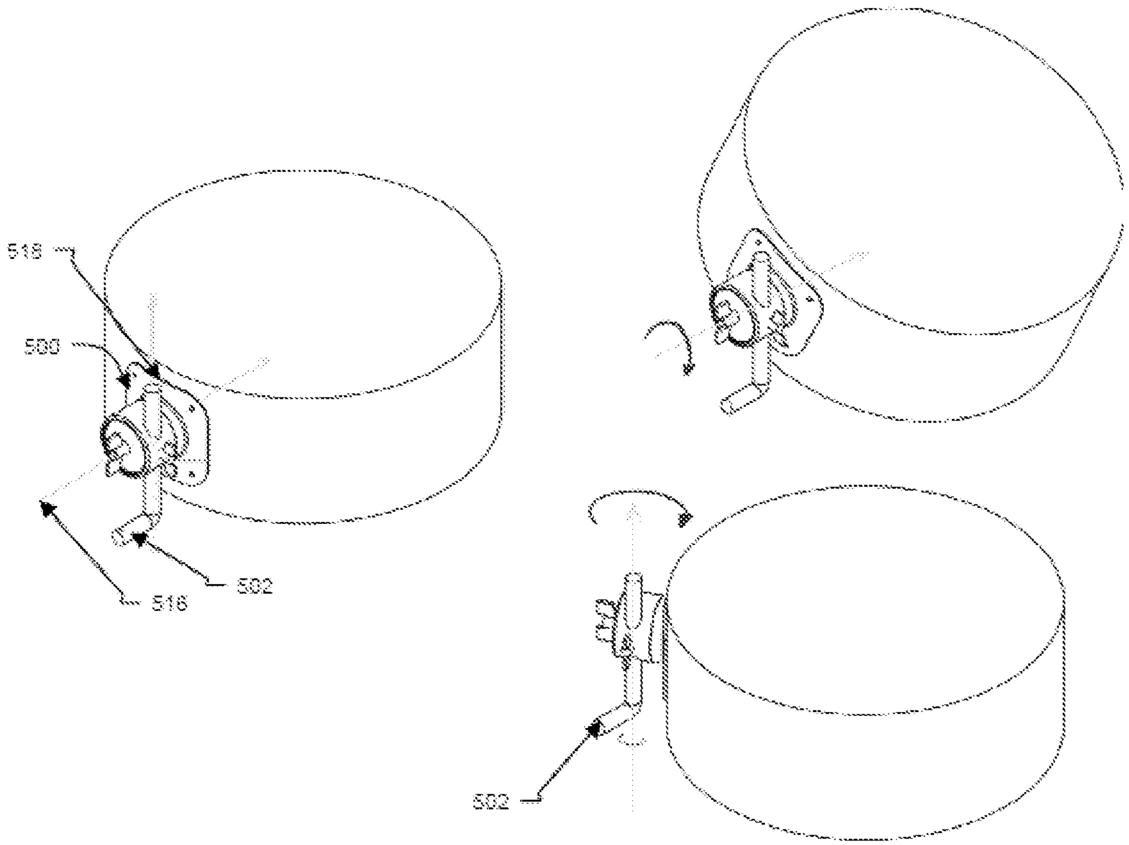
FIG. 5E illustrates exemplary working of a modular bracket of the proposed drum kit, in accordance with an embodiment of the present disclosure.

In an embodiment, the modular brackets 500 can allow rotation of the respective drum along a first axis 516 and a second axis 518 of the respective modular bracket 500 by loosening and/or tightening of the second wing nut 508 and the third wing nut 512 (shown in FIG. 5E).

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present disclosure provides an efficient solution to the aforementioned problems associated with typical drum kits.

The present disclosure provides a portable drum kit which can obviate limitations of typical drum sets.

The present disclosure provides a pre-assembled drum kit to make it quick and convenient to open and repack, by single person easily. Further, being attached to each other, there is no fear of missing any part while travelling or packing or unpacking.

The present disclosure provides a simple and cost effective portable drum kit a drum kit with all the components of a traditional 5-piece drum kit without compromising on the quality and utility of a conventional acoustic drum kit but with convenience of transportation, packing, unpacking and utilising the same with economical ways.

I claim:

1. A portable drum kit comprising:

a base;

one or more musical instruments comprising one or more drums and at least one cymbal to be fitted on the base;

one or more vertical columns fixed to the base to support at least one of the one or more musical instruments at a predefined height above the base;

one or more rod members detachably coupled to the one or more musical instruments; and at least one pair of modular clamps adapted to enable fitment of the least one of the one or more drums and the at least one cymbal to the one or more vertical columns;

wherein each of the at least one pair of modular clamps comprises a double v-clamp to engage with one of the one or more vertical columns or one of the one or more rod members detachably coupled to the one or more musical instruments or any other rod like structure, and at least one cylindrical coupling member having either a female coupling or a male coupling that is fitted on outer surface of the cylindrical coupling member to engage with the corresponding male coupling or female coupling of the corresponding modular clamp, and a first wing nut for connecting the at least one cylindrical coupling member with the double v-clamp, and wherein the at least one cylindrical coupling member having serration that engages with corresponding serration on the double v-clamp to allow coupling of the at least one cylindrical coupling member with the double v-clamp in different orientation along an axis of the corresponding modular bracket.

2. The portable drum kit as claimed in claim 1, wherein the at least one cylindrical coupling member of each of the at least one pair of modular clamp comprises at least one first cylindrical coupling member having a female coupling, and at least one second cylindrical coupling member having a male coupling to engage with the corresponding female coupling of the corresponding modular clamp, and wherein at least one of the at least one first cylindrical coupling member and the at least one second cylindrical coupling member having serration on any or both of a lower surface and an upper surface to enable engagement of the at least one first cylindrical coupling member with the at least one second cylindrical coupling member in different orientation along the axis of the respective modular clamp.

3. The portable drum kit as claimed in claim 2, wherein a spare male coupling or female coupling of each of the at least one pair of modular clamps allow coupling with the corresponding female coupling or male coupling of another modular clamp to allow coupling of another musical instrument or other elements.

4. The portable drum kit as claimed in claim 1, wherein the double V-clamp of the each of the at least one pair of modular clamps comprises an upper member, lower member and a lock wing nut to enable tightening or loosening of the double V-clamp.

5. The portable drum kit as claimed in claim 1, wherein the at least one pair of modular clamps allow movement of the at least one of the one or more drums and the at least one cymbal between a collapsed position in which the least one of the one or more drums and the at least one cymbal are placed closer to each other, and a deployed position in which the least one of the one or more drums and the at least one cymbal are placed at desired positions to allow a percussionist to use the drum kit.

6. The portable drum kit as claimed in claim 1, wherein the portable drum kit comprises one or more modular brackets to enable coupling of the one or more rod members to the one or more musical instruments, and wherein the one or more rod members are generally L-shaped.

7. The portable drum kit as claimed in claim 6, wherein each of the one or more modular bracket comprises a base bracket member configured for fitment to the at least one of the one or more drums and a holding member configured for fitment with base bracket member with assistance of a second wing nut, and having at least one hole for fitment of the corresponding rod member with assistance of a third wing nut.

8. The portable drum kit as claimed in claim 7, wherein the each of the one or more modular bracket comprises at least one coupling member having either a female coupling or a male coupling to allow coupling of one or more other elements to the corresponding brackets, and wherein the at least one coupling member is configured for fitment between the base bracket and the holding member.

9. The portable drum kit as claimed in claim 7, wherein each of the one or more modular brackets allow rotation of the respective drum along a first axis and a second axis of the respective modular bracket.

10. The portable drum kit as claimed in claim 1, wherein the one or more drums comprises a bass drum, mid tom, a high tom, a floor tom and a snare drum, and wherein the at least one cymbal comprises a crash cymbal, a ride cymbal and a hi-hats cymbal.

11. The portable drum kit as claimed in claim 1, wherein the base comprises a plurality of caster configured on a lower surface of the base to allow movement of the base, and wherein each of the plurality of casters comprises a lock arrangement to lock the corresponding caster to prevent movement of the base.

12. The portable drum kit as claimed in claim 1, wherein the portable drum kit comprises an outer cover to cover the one or more musical instruments, wherein one or more latches are provided with the outer cover to lock the outer cover with the base, and wherein the outer cover comprises a handle fitted to an outer surface of the outer cover for easy handling of the drum kit, and one or more pockets on sides of the outer cover to store drum playing sticks, books, spare accessories, cables and other small items.

13. The portable drum kit as claimed in claim 1, wherein the portable drum kit comprises an extendable base to support a remote hi-hat pedal, wherein the extendable base is pivotally coupled to the base to move between a folded position in which the extendable base is folded and an extended position in which the extendable base is positioned adjacent to the base to support the remote hi-hat pedal, and wherein the portable drum kit comprises a throne for the percussionist to sit, and an audio interface for mics.

14. A portable drum kit comprising:

a base;

one or more musical instruments comprising one or more drums and at least one cymbal to be fitted on the base;

one or more vertical columns fixed to the base to support at least one of the one or more musical instruments at a predefined height above the base;

one or more modular brackets adapted for fitment with at least one of the one or more drums; and at least one pair of modular clamps adapted to enable fitment of the least one of the one or more drums and the at least one cymbal to the one or more vertical columns;

wherein each of the one or more modular brackets comprises a base bracket member configured for fitment to the at least one of the one or more drums and a holding member configured for fitment with base bracket member with assistance of a second wing nut, and having at least one hole, and a road member configured for fitment to the at least one hole of the holding member with assistance of a third wing nut.

15. The portable drum kit as claimed in claim 14, wherein each of the at least one pair of modular clamps comprises a double v-clamp to engage with one of the one or more vertical columns or one of the one more rod members detachably coupled to the one more modular brackets or any other rod like structure, and at least one cylindrical coupling member having either a female coupling or a male coupling that is fitted on outer surface of the cylindrical coupling member to engage with the corresponding male coupling or female coupling of the corresponding modular clamp, and a first wing nut for connecting the at least one cylindrical coupling member with the double v-clamp, and wherein the at least one cylindrical coupling member having serration that engages with corresponding serration on the double v-clamp to allow coupling of the at least one cylindrical coupling member with the double v-clamp in different orientation along an axis of the corresponding modular bracket.

16. The portable drum kit as claimed in claim 15, wherein the at least one cylindrical coupling member of each of the at least one pair of modular clamp comprises at least one first cylindrical coupling member having a female coupling, and at least one second cylindrical coupling member having a male coupling to engage with the corresponding female coupling of the corresponding modular clamp, and wherein at least one of the at least one first cylindrical coupling member and the at least one second cylindrical coupling member having serrations on any or both of a lower surface and an upper surface to enable engagement of the at least one first cylindrical coupling member with the at least one second cylindrical coupling member in different orientation along the axis of the respective modular clamp.

17. The portable drum kit as claimed in claim 16, wherein a spare male coupling or female coupling of each of the at least one pair of modular clamps allow coupling with the corresponding female coupling or male coupling of another modular clamp to allow coupling of another musical instrument or other elements.

18. The portable drum kit as claimed in claim 14, wherein the at least one pair of modular clamps allow movement of the at least one of the least one of the one or more drums and the at least one cymbal between a collapsed position in which the least one of the one or more drums and the at least one cymbal are placed closer to each other, and a deployed position in which the least one of the one or more drums and the at least one cymbal are placed at desired positions to allow a percussionist to use the drum kit.

19. The portable drum kit as claimed in claim 14, wherein the each of the one or more modular brackets comprises at least one coupling member having either a female coupling or a male coupling to allow coupling of one or more other elements to the corresponding modular brackets, and wherein the at least one coupling member is configured for fitment between the base bracket and the holding member.

20. The portable drum kit as claimed in claim 14, wherein each of the one or more modular brackets allow rotation of the respective drum along a first axis and a second axis of the respective modular bracket, and wherein the one or more rod members are generally L-shaped.

* * * * *